United States Patent Office 3,590,002
Patented June 29, 1971

3,590,002
MIXTURES OF 2,4'-DIISOCYANATO DICYCLO-HEXYLMETHANE WITH LOWER ALIPHATIC AND CYCLOALIPHATIC POLYISOCYANATES
Eugene L. Powers, New Martinsville, W. Va., assignor to Mobay Chemical Company, Pittsburgh, Pa.
No Drawing. Filed July 21, 1967, Ser. No. 654,982
Int. Cl. C07c *119/04*
U.S. Cl. 252—182
3 Claims

ABSTRACT OF THE DISCLOSURE 2,4'-diisocyanato dicyclohexylmethane and mixtures thereof with other isocyanates, particularly polyisocyanates, as well as polyurethane plastics prepared therefrom.

---

This invention relates to diisocyanato dicyclohexylmethane and more particularly to 2,4'-diisocyanato dicyclohexylmethane and mixtures thereof with other related isocyanates and stereoisomers of the 2,4-positional isomer and related compounds.

The compound 4,4'-diisocyanato dicyclohexylmethane is known. Unless special precautions are taken to incorporate certain stereoisomers this compound is a solid at ordinary temperatures (melting point 83° C.) and has relatively poor solubility and compatibility with polyols, for example, where it could be used advantageously to prepare polyurethane coatings, foams and the like. Even if the product is formulated so as to contain a proportion of stereoisomers so that it is liquid at room temperature it is nevertheless not entirely satisfactory for the production of polyurethanes. One would suppose that all isomers of the same backbone would have very much the same properties. This is not the case as will be explained in more detail below.

It is, therefore, an object of this invention to provide an improved diisocyanato dicyclohexylmethane. A further object of this invention is to provide an improved diisocyanato dicyclohexylmethane which when mixed with heretofore known organic polyisocyanates improves their properties, particularly with regard to compatibility with polyols and the like used in the production of polyurethane plastics and particularly with regard to reactivity to produce polyurethanes having improved properties. Another object of this invention is to provide a mixture of diisocyanato dicyclohexylmethane compounds which have improved properties, particularly with regard to the preparation of polyurethane plastics. Still a further object of this invention is to provide improved polyurethane plastics based on diisocyanato dicyclohexylmethane type of isocyanates. A further object of this invention is to provide coating compositions which have improved adhesion and improved resistance to weathering and particularly ultraviolet light which are based on diisocyanate dicyclohexylmethane.

The foregoing objects and others which will become apparent from the following description are accomplished in accordance with the invention, generally speaking, by providing 2,4'-diisocyanato dicyclohexylmethane, mixtures thereof with other polyisocyanates and polyurethanes prepared from either the pure 2,4'-diisocyanato dicyclohexylmethane or mixtures thereof with other polyisocyanates.

The 2,4'-diisocyanato dicyclohexylmethane is a unique compound as compared to the other positional isomers or diisocyanato dicyclohexylmethane. The 2,4'-isomer is a liquid at room temperature and stays liquid even below 0° C. Thus, a sample may be stored at −18° C. for 48 hours and it will still be liquid. This renders the compound much easier to use in the preparation of coatings, elastomers and the like where it is reacted with organic polyols, for example. Further, this isomer when reacted with itself produces a polyisocyanurate having groups with identical reactivity. The coatings produced using this isocyanate have a very short tack time but cure to an elastic product. Moreover, polyurethane elastomers based on these materials have improved softness and elasticity. The improved compatability of the 2,4'-diisocyanato dicyclohexylmethane with other components used in the preparation of polyurethane plastics is particularly and most readily apparent when the isocyanates of the invention are mixed with polyols at room temperature. The 4,4'-isomer separates out before it becomes completely reacted with the polyol, whereas the 2,4'-isomer remains mixed producing an evenly reacted product. This is especially surprising in view of the different postions of the —NCO groups on the ring which one would expect to produce different reactivities. Still another isomer which is theoretically possible is the 2,2'-isomer but this isocyanate either does not exist or exists in only minute quantities since hydrogenation of the corresponding aromatic amine apparently causes it to decompose.

No attempt is made herein to explain the improved compatibility of the 2,4'-isomer with organic components of polyurethanes including elastomers, coatings and foams. It is pointed out, however, that the 2,4'-isomer is a liquid at ordinary temperatures and there is a tendency for mixtures of it with other organic polyisocyanates at least where it is present in substantial amounts, to be liquid also. In any mixture of the 2,4'-diisocyanato dicyclohexylmethane with other isocyanates at least 30% by weight of the mixture must be the 2,4'-diisocyanato dicyclohexylmethane in order to achieve substantial beneficial properties from this isocyanate. Thus, it is possible to mix the 2,4'-diisocyanato dicyclohexylmethane with amounts up to 70% by weight of any other monomeric organic polyisocyanate. It is preferred that the additional organic monomeric polyisocyanate be an aliphatic or cycloaliphatic polyisocyanate in order that the resulting polyurethane product will have good light stability. Suitable polyisocyanates include, for example, ethylene diisocyanate, propylene-1,2-diisocyanate, cyclohexylene-1,4-diisocyanate, hexamethylene diisocyanate, 4,4'-diisocyanato dicyclohexylmethane, the biuret prepared by reacting hexamethylene diisocyanate with water according to U.S. Pat. 3,124,605 or the like. In accordance with a particularly preferred embodiment of the invention mixtures of from about 30 to 95% by weight of 2,4'-diisocyanato dicyclohexylmethane and about 5 to 70% by weight of 4,4'-diisocyanato dicyclohexylmethane are provided wherein less than 50% of the stereoisomers in the mixture are the trans,trans-isomer 4,4'-diisocyanato dicyclohexylmethane. It is understood that where positional isomers such as 2,4'-diisocyanato dicyclohexylmethane or 4,4'-diisocyanato dicyclohexylmethane are present that it is always possible to have at least three stereoisomers including various mixtures of any two or all of these isomers. In other words, these products exist as cis,cis-; cis,trans-; and trans,trans-isomers. In accordance with a preferred embodiment of the invention it has been found that not more than 50% of the total amount of 4,4'-diisocyanato dicyclohexylmethane present should be the trans,trans-isomer. The amount of stereoisomers in a reaction mixture can be controlled by the time and temperature at which the hydrogenation of the diamino diphenylmethane corresponding thereto is carried out and by the use of certain catalysts as more particularly set forth below.

The isocyanate of the present invention is preferably prepared in a two-step process. In the first stage the 2,4'-diamino diphenylmethane [this compound is known, Ricter, "Beilstein's Handbuch Der Organischen Chemis," vol.

13, Second Supplement, page 110 (1950)] is hydrogenated to prepare 2,4'-diaminodicyclohexylmethane. In the second stage this amine is converted to the isocyanate, preferably by reaction with phosgene. In the hydrogenation stage any suitable hydrogenation catalyst may be used, if desired with a solvent, and the reaction is preferably carried out under pressure. Any suitable hydrogenation procedure may be used, including that disclosed in U.S. Pat. 2,817,644. Any suitable hydrogenation catalyst may be used, including for example platinum, ruthenium, rhodium, nickel, copper, chromium alloys, base promoted cobalt catalysts such as disclosed in OPB Report, TB-742 (1941) and the like. It is preferred to use a ruthenium catalyst wherein the active catalyst component is either elementary ruthenium, a ruthenium oxide, a salt of ruthenium in which the ruthenium is in the anion, or a salt of ruthenium in which the ruthenium the cation and the anion is non-polymeric. Thus, there can be used such compounds as the oxides, for example ruthenium sesquioxide, ruthenium dioxide and ruthenium tetraoxide; salts such as perruthenites, for example, barium perruthenite, sodium perruthenite, etc.; ruthenates, for example potassium, sodium, barium, strontium, calcium, magnesium and silver ruthenates, perruthenates, for example, potassium and sodium perruthenates, ruthenium halides, for example, ruthenium pentafluoride, and ruthenium dichloride, ruthenium trichloride and ruthenium tetrachloride, ruthenium chlorosalts, for example potassium chloroperruthenate, ruthenium sulfides, for example, ruthenium disulfide and trisulfide, ruthenium sulfate, ruthenium nitrosonitrate, and the like. The material can be activated by means well known in the art. The ruthenium can be extended, if desired, on a carrier such as charcoal, silica gel, alumina, and the like. The extended catalysts can be made by fusing ruthenium or its oxide with sodium peroxide, dissolving the salt, pouring the resulting solution over the extender and drying the impregnated mass. Depending on the selection of the hydrogenation catalyst the temperature of hydrogenation may vary over a wide range but is preferably between about 25° C. and about 300° C. and most preferably in the range of about 50 to about 250° C. The hydrogenation can be carried out in the presence of ammonia to reduce side reactions. Moreover, the hydrogenation reaction can be carried out at atmospheric pressure or even at elevated pressures up to about 10,000 p.s.i.g. The most preferred hydrogenation pressure is from about 1500 p.s.i.g. to 5000 p.s.i.g.

In the event that 100% conversion of the 2,4'-diamino diphenylmethane to the corresponding saturated amine is not obtained then it is possible to separate the saturated ring compound from the aromatic amine or partially reacted products by distillation since the pure 2,4'-diamino dicyclohexylmethane boils at about 130° C./1 mm. Hg and the 2,4'-diamino diphenylmethane boils at about 188° C./1 mm. Hg.

The resulting 2,4'-diamino dicyclohexylmethane is converted to the isocyanate by any suitable known process including, for example, phosgenation of the amine or an amine salt, for example, as disclosed at page 108 of Annalen der Chemie 562, 75 (1949). It is preferred to use the so-called "cold phase-hot phase" phosgenation process wherein the 2,4'-diamino dicyclohexylmethane is mixed with an inert organic solvent such as, for example, monochlorobenzene, dichlorobenzene, toluene and the diethylether of diethylene glycol or the like, and then combined with $CO_2$ to form a salt (slurry) and the salt is mixed with phosgene at a temperature preferably between about —10° C. and about 80° C. The slurry is then further phosgenated at a temperature of from about 50° C. to about 200° C. to prepare the resulting isocyanate. The resulting isocyanate has the formula

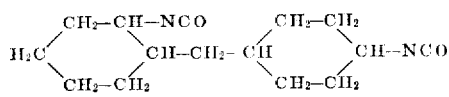

It is not necessary to prepare the pure compound but it is possible in accordance with the invention to simultaneously prepare a mixture of 2,4'-diamino dicyclohexylmethane and 4,4'-diamino dicyclohexylmethane and then phosgenate this mixture under essentially the same conditions as set forth above in order to prepare the preferred mixture of diisocyanato dicyclohexylmethanes of the invention. In carrying out this process it is preferred to use such reaction conditions as to produce a maximum of 50% of the trans, transisomers of the 4,4'-diamino dicyclohexylmethane. This can be accomplished by employing a ruthenium cataly and temperatures above about 150° C. in the hydrogenation of the mixture.

The invention also contemplates polyurethane plastics which are prepared by reacting the 2,4'-diisocyanato dicyclohexylmethane or mixture thereof with another polyisocyanate in the proportions set forth above with an organic compound containing active hydrogen containing groups as determined by the Zerewitinoff method. Generally speaking, any compound having an active hydrogen atom as defined above which will react with an —NCO group may be used. It is to be understood that when the above terminology is used, active hydrogen containing compounds are contemplated which may contain any of the following types of active hydrogen containing groups, among others, —OH, —NH₂, —NH—, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including both aromatic, aliphatic and heterocyclic diamines, triamines, tetramines and the like; as well as mixtures thereof. Compounds which contain two or more different groups within the above-defined classes may also be used in accordance with the invention such as, for example, amino alcohols which contain an amino group and an hydroxyl group, amino alcohols which contain two amino groups and one hydroxyl group and the like. Also, compounds may be used which contain one —SH group and one —OH group or two —OH groups and one —SH group as well as those which contain an amino group and an —SH group and the like.

The molecular weight of the organic compound containing at least two active hydrogen containing groups may vary over a wide range. Preferably, however, at least one of the organic compounds containing at least two active hydrogen containing groups which is used in the production of a polyurethane plastic has a molecular weight of at least about 200 and preferably between about 500 and about 5000 with an hydroxyl number within the range of from about 25 to about 800 and acid numbers, where applicable, below about 5. A satisfactory upper limit for the molecular weight of the organic compound containing at least two active hydrogen containing groups is about 10,000 but this may vary so long as satisfactory mixing of the organic compound containing at least two active hydrogen containing groups with the organic polyisocyanate can be obtained. In addition to the high molecular weight organic compound containing at least two active hydrogen containing groups, it is desirable to use an organic compound of this type having a molecular weight below about 750 and preferably below about 500. Aliphatic diols and triols are most preferred for this purpose.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, aplhahydromuconic acid, betahydromuconic acid, alpha-butyl-alpha-ethyl-glutaric acid, alpha-beta-diethylsuccinic acid, isophthalic acid, terephthalic acid, hemimellitic acid, trimellitic acid, trimesic acid, mellophanic acid, prehnitic acid, pyromellitic acid, benzene-pentacarboxylic acid and the like. Any suitable polyhydric alcohol may be used such as, for example, ethylene glycol, 1,3-propylene glycol, 1,2-butylene glycol, 1,2-propylene glycol, 1,4-butylene glycol, 1,3-butylene glycol, 1,5-pentane diol, 1,4-pentane diol, 1,3-pentane diol, 1,6-hexane diol, 1,7-heptane diol, glycerine, trimethylolpropane, 1,3,6-hexanetriol, trithanolamine, pentaerythritol, sorbitol and the like.

Any suitable polyhydric polyalkylene ether may be used such as, for example, the condensation product of an alkylene oxide beginning with any suitable initiator. The initiator may be a difunctional compound including water so that the resulting polyether is essentially a chain of repeating alkylene oxy groups as in polyethylene ether glycol, polypropylene ether glycol, polybutylene ether glycol and the like; or the initator may be any suitable active hydrogen containing compound which may be a monomer or even a compound having a relatively high molecular weight including other active hydrogen containing compounds as disclosed herein. It is preferred that the initiator have from 2 to 8 active sites to which the alkylene oxides may add, including, for example, amines, alcohols and the like. Any suitable alkylene oxide may be used such as, for example, ethylene oxide, propylene oxide, butylene oxide, amylene oxide, tetrahydrofuran, epihalohydrins such as epichlorohydrin, styrene oxide and the like. Any suitable initiator may be used including, for example, water, polyhydric alcohols, preferably having 2 to 8 hydroxyl groups, amines, preferably having 2 to 8 replaceable hydrogen atoms bonded to nitrogen atoms. Phosphorous acids may also be used, but the phosphorous compounds are somewhat peculiar in that a different mode of preparation may be required, as more particularly set forth below. The resulting polyhydric polyalkylene ethers with the various bases of nitrogen, phosphorous and the like may have either primary or secondary hydroxyl groups or mixtures of primary and secondary hydroxyl groups. It is preferred to use alkylene oxides which contain from 2 to 5 carbon atoms and, generally speaking, it is advantageous to condense from about 5 to about 30 mols of alkylene oxide per functional group of the initiator. There are many desirable processes for the preparation of polyhydric polyalkylene ethers including U.S. Pats. Nos. 1,922,459, 3,009,939 and 3,061,625 or by the process disclosed by Wurtz in 1859 and in Encyclopedia of Chemical Technology, vol. 7, pages 257 to 262, published by Interscience Publishers, Inc. (1951).

Specific examples of initiators are water, ethylene glycol, propylene glycol, glycerine, trimethylol propane, pentaerythritol, arbitol, sorbitol, maltose, sucrose, ammonia, diethanolamine, triethanolamine dipropanolamine, tripropanolamine, diethanolpropanolamine, tributanolamine, 2,4-tolylene diamine, 4,4'-diphenylmethane diamine, p,p', p''-triphenylmethane triamine, ethylene diamine, propylene diamine, propylene triamine, N,N,N',N'-tetrakis-(2-hydroxypropyl) ethylene diamine, diethylene triamine. The phosphorous containing polyols are more fully described below.

Any suitable polyhydric polythioether may be used such as, for example, the condensation product of thiodiglycol or the reaction product of a polyhydric alcohol such as is disclosed above for the preparation of the hydroxyl polyesters with any other suitable thioetherglycol. Other suitable polyhydric polythioethers are disclosed in U.S. Pats. Nos. 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a polyhydric alcohol such as those disclosed above for use in the preparation of the hydroxyl polyesters.

Any suitable aliphatic polyol may be used such as, for example, alkane diols such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexane diol, 1,7-heptane diol, 2,2-dimethyl-1,3-propane diol, 1,8-octane diol and the like including 1,20-eicosane diol and the like; alkene diols such as, for example, 1-butene-1,4-diol, 1,3-butadiene-1,4-diol, 2-pentene-1,5-diol, 2-hexene-1,6-diol, 2-heptene-1,7-diol and the like; alkylene diols such as, for example, 2-butyne-1,4-diol, 1,5-hexadiyne-1,6-diol and the like; alkane triols such as for example, 1,3,6-hexanetriol, 1,3,7-heptane triol, 1,4,8-octane triol, 1,6,12-dodecane triol and the like; alkene triol such as 1-hexene-1,3,6-triol and the like; alkyne triols such as 2-hexyne-1,3,6-triol and the like; alkyne triols such as 2-hexyne-1,3,6-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like.

Any suitable polyamine may be used including, for example, aromatic polyamines such as, for example, p-amino aniline, 1,5-diamino naphthalene, 2,4-diamino toluylene, 1,3,5-benzene triamine, 1,2,3,-benzene triamine, 1,4,5,8-naphthalene tetramine and the like; aliphatic polyamines such as, for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridine, 2,4-diamino-2-aminomethyl pyrimidine, 2,5-diamino-1,3,4-thiodiazol and the like.

Phosphorous containing compounds are often advantageously used because of the flame retarding effect which they impart to the resulting plastics. These compounds often contain 1 or 2 phosphorous atoms as a nucleus and then have alkylene oxide side chains bonded to the phosphorous nucleus through either phosphate or phosphite type linkages. The phosphate compounds are advantageously prepared by condensing a mixture of phosphorous pentoxide and water with an alkylene oxide as more particularly set forth above. It is advantageous to use mixtures of phosphorous pentoxide and water which correspond to about 80 percent phosphorous pentoxide and about 20 percent water. But any amount within the range of about 65 percent to 90 percent phosphorous pentoxide and the balance water may be used and the whole range is contemplated. The phosphites are advantageously prepared in accordance with the method of U.S. Pat. No. 3,009,939 where triphenyl phosphite, for example, is reacted with a polypropylene ether glycol to prepare a product having a molecular weight of about 500. Other processes are disclosed in the patent. It is also possible to use polyethers based on phosphorous which contain nitrogen atoms in addition to the phosphorous atoms. These compounds may be represented by the general formula:

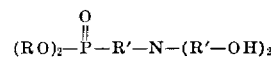

wherein R is lower alkyl or phenyl, for example, methyl, ethyl, propyl, butyl and the like and the R' is alkylene, preferably having from 1 to 4 carbon atoms such as methylene, ethylene, 1,2-propylene, 1,4-butylene and the like. A preferred compound is dioxyethylene-N,N-bis-(2-hydroxyethyl) aminomethyl phosphonate.

Any of the active hydrogen containing compounds of any of the classes set forth above may be substituted with halogen such as, for example, chloro, bromo, iodo and the like; nitro; alkoxy, such as, for example, methoxy, ethoxy, carbomethoxy, carbethoxy and the like; dialkyl amino such as, for example, dimethyl amino, diethyl amino, dipropyl amino, methylethyl amino and the like; mercapto, carbonyl, thiocarbonyl, phosphoryl, phosphato and the like.

In the production of the polyurethane foams, in addition to the 2,4'-diisocyanato dicyclohexylmethane or mixture thereof with other organic polyisocyanates, the active hydrogen containing compound and the blowing agent, which may be water, a halohydrocarbon such as dichlorodifluoromethane, trichlorofluoromethane or the like, an alkane such as hexane or the like, it is often advantageous to include other components which aid in making a product having the best physical properties. It is particularly desirable to use a catalyst and a stabilizer. Any suitable catalyst may be used, but as has been proposed heretofore, it is often desirable to have a mixture of a tin compound and a tertiary amine catalyst present. Any suitable tin compound may be used including, for example, stannous chloride or an organic tin compound. It is preferred to use the tin compounds such as the stannous salts of carboxylic acids including stannous oleate, stannous octoate, stannous stearate and the like. One may also use tetravalent tin compounds including for example dibutyl tin dilaurate, dibutyl tin di-2-ethyl hexoate and the like. Any suitable tertiary amine catalyst may be used and a particularly strong tertiary amine catalyst is triethylene diamine. If weaker catalysts are desired one may use for example, N-methyl morpholine, N-ethyl morpholine, diethyl ethanolamine, N-coco morpholine 1-methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine, permethylated diethylene triamine and the like.

It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Pat. No. 2,834,748. Where polyhydric polyalkylene ethers are included in the reaction mixture to prepare a cellular polyurethane plastic, it is preferred to employ a silicone oil of the above patent within the scope of the formula:

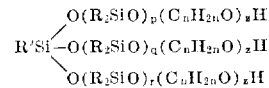

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. A preferred compound has the formula:

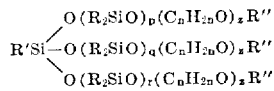

wherein $(C_nH_{2n}O)$ is a mixed polyoxyethylene and oxypropylene block copolymer containing about 17 oxyethylene units and about 13 oxypropylene units. Other suitable stabilizers are disclosed in Canadian Pat. Nos. 668,478, 668,537 and 670,091. Other suitable compounds may therefore have the formula $$(R')(SiO_3)_x(R_2SiO)_y[(C_nH_{2n}O)_zH]_a[R''']_{3x-a}$$

where X is an integer and represents the number of trifunctional silicone atoms bonded to a single monovalent or polyvalent hydrocarbon radical, R'; R is a monovalent hydrocarbon group as defined above; $a$ is an integer having a value of at least 1 and represents the number of polyoxyalkylene chains in the block copolymer; $y$ is an integer having a value of at least 3 and denotes the number of difunctional siloxane units, $n$ is an integer from 2 to 4 denoting the number of carbon atoms in the oxyalkylene groups; and $z$ is an integer having a value of at least 5 and denotes the length of the oxyalkylene chain. It will be understood further that such compositions of matter are mixtures of such block copolymers wherein $y$ and $z$ are of different values and that method of determining the chain length of the polysiloxane chains and the polyoxyalkylene chains give values which represent average chain length. In the above formula, R represents monovalent hydrocarbon radicals, such as alkyl, aryl or aralkyl radicals, the polyoxyalkylene chain terminates with a hydrogen atom, R''' is an alkyl radical or a trihydrocarbonsilyl radical having the formula R$_3$Si— where R is a monovalent hydrocarbon radical and terminates a siloxane chain, and R' represents a monovalent or polyvalent hydrocarbon radical, being monovalent when $x$ is 1, divalent when $x$ is 2, trivalent when $x$ is 3, tetravalent when $x$ is 4.

One type of block copolymer is represented when $x$ in the above formula is one, and in this instance a branched chain formula may be postulated as follows:

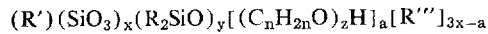

where $pqr=y$ of the above formula and has a minimum value of 3, the other subscripts being the same as in the foregoing formula. In this instance all three of the oxyalkylene chains are joined to the end of polysiloxane chains of the type —(R$_2$SiO)—. Specifically, one could use

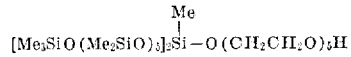

The polyisocyanate of the invention may also be used for the production of coating compositions. In this case, the organic compound containing active hydrogen containing groups is reacted with the polyisocyanate of the invention in an inert organic solvent therefor, such as, for example, methyl formamide, the diethyl ether of diethylene glycol, benzene, xylene, benzine and the like.

It is also possible to use the polyisocyanate of the invention in the preparation of elastomeric products which are nonporous for example by reacting an organic compound containing active hydrogen containing groups with an excess of the polyisocyanate of the invention in a first step to prepare an isocyanato-terminated prepolymer under anhydrous conditions. This prepolymer is then reacted in a second step with a chain extending agent such as, for example, 1,4-butane diol, 1,3-butane diol, the bis-beta-hydroxy ethyl ether of hydroquinone, water or the like by mixing the cross-linking agent with the prepolymer and casting the resulting mixture in a mold.

The polyurethane plastics of the invention are useful where polyurethanes have been used heretofore. For example, the foams are useful for cushions and especially rigid foams are useful for both sound and thermal insulation, for example, for walls of buildings. The coatings may be used to coat wood or metals such as steel and the like. The elastomers are useful for the production of tires or for molded items such as gear wheels or the like.

The invention is further illustrated by the following examples in which parts are by weight unless otherwise specified.

EXAMPLE 1

In a pressure vessel is placed about 100 parts of 2,4'-diamino diphenylmethane, about 300 millimeters of dioxane, about 40 parts of ammonia and about 20 parts of a finely divided catalyst comprising 5 percent ruthenium on alumina. The temperature is raised to about 200° C. and hydrogen is admitted to a total pressure of about 5000 lbs. p.s.i.g. As hydrogen is absorbed, subsequent additions of hydrogen are made to maintain a total pressure at about 5000 p.s.i.g. Hydrogenation is complete after about 4 minutes. The fully hydrogenated product is recovered and analyzed to be 2,4'-diamino dicyclohexylmethane along with about 2.8 percent low boiling materials and about 1.9 percent high boiling residue.

About 100 parts of substantially pure 2,4'-diamino dicyclohexylmethane prepared as above are dissolved in about 1100 parts of orthodichlorobenzene with stirring and saturated with carbondioxide at a temperature of about 90 to 95° C. After saturation with carbondioxide is complete as indicated by no further absorption, the resulting saturated solution is stirred approximately 6 hours at about 95° C. This mixture is cooled to a temperature below about 0° C. and about 360 parts of gaseous phosgene is introduced. During the phosgene addition the temperature is not allowed to rise above about 0° C. The solution is gradually heated to about 160° C. and phosgene is continuously introduced at this temperature until no further phosgene is absorbed. At this time the excess phosgene is removed by blowing out with nitrogen gas for about 30 minutes and substantially pure 2,4'-diisocyanate dicyclohexylmethane is recovered.

EXAMPLE 2

About 100 parts of a polyhydric polyalkylene ether prepared by condensing propylene oxide with glycerine until a polyalkylene ether triol having a hydroxyl number of about 56 is obtained are mixed with about 57 parts of the 2,4'-diisocyanato dicyclohexylmethane prepared in Example 1, about 3 parts of water, about 0.3 part of stannous octoate, about 0.5 part of 1-methyl-4-dimethylaminoethyl piperazine and about 1 part of a silicone oil having the formula

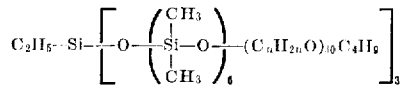

wherein($C_nH_{2n}O$) is a mixed polyoxyethylene and oxypropylene block copolymer containing about 17 oxyethylene units and about 13 oxypropylene units. These components are mixed in a machine mixer as disclosed in U.S. Reissue Pat. 25,414 and discharged into a mold where they assume a creamy appearance and form a polyurethane foam in a short time.

EXAMPLE 3

About 111 parts of a hydroxyl polyester, having a hydroxyl number of about 56 and having been prepared from adipic acid and equal molar quantities of 1,4-butane diol and ethylene glycol, about 20 parts of 1,4-butane diol and about 0.05 part of dibutyl tin dilaurate are premixed and then mixed with about 80 parts of the 2,4-diisocyanato dicyclohexylmethane prepared in Example 1. The resulting mixture is casted in the form of a gear wheel in a mold where it cures in a short time to prepare an elastic soft gear wheel having good wear properties.

EXAMPLE 4

The 2,4'-diisocyanato dicyclohexylmethane prepared in Example 1 is mixed with a triol prepared by adding 3 mols of propylene oxide to 1 mol of trimethylolpropane. The product is compatible and reacts in a short time to prepare a substantially clear elastomeric product.

When the foregoing experiment is repeated except that 4,4'-diisocyanato dicyclohexylmethane is used the product is nonhomogeneous and a large amount of the 4,4'-diisocyanato dicyclohexylmethane settles from the solution without reacting. All of the components were mixed at room temperature.

EXAMPLE 5

Example 1 is repeated except that the starting materials are a mixture of about 40 percent 2,4'-diamino diphenlymethane and about 60 percent 4,4'-diamino diphenlymethane. The resulting product is a mixture of about 40 percent 2,4'-diisocyanato dicyclohexylmethane and about 60 percent 4,4'-diisocyanato dicyclohexylmethane.

EXAMPLE 6

Example 1 was again repeated using 80 percent 2,4'diamino diphenylmethane and 20 percent 4,4'-diamino diphenylmethane. Again the product was the corresponding mixture of diisoycanate.

It is to be understood that the foregoing examples are given for the purpose of illustration and that any other suitable amine, catalyst, solvent, phosgenation conditions or the like could be used therein provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention.

What is claimed is:

1. Mixtures of at least 30 percent by weight of 2,4'-diisocyanato dicyclohexylmethane and the balance at least one different organic polyisocyanate selected from the group consisting of lower aliphatic and cycloaliphatic polyisocyanates containing up to 12 carbon atoms in the molecule.

2. Mixtures of at least 30 percent by weight of 2,4'-diisocyanato dicyclohexylmethane and the balance at least one different polyisocyanate selected from the group consisting of ethylene diisocyanate, propylene-1,2-diisocyanate, cyclohexylene-1,4 - diisocyanate, hexamethylene diisocyanate, 4,4'-diisocyanato dicyclohexylmethane, and the biuret prepared by reacting hexamethlyene diisocyanate with water.

3. Mixtures of 30 to 95 percent by weight of 2,4'-diisocyanate dicyclohexylmethane and the balance 4,4'-diisocyanato dicyclohexylmethane, less than 50 percent of the stereoisomers of said 4,4'-diisocyanato dicyclohexylmethane being the trans, transisomer.

References Cited

UNITED STATES PATENTS

| 3,357,954 | 12/1967 | Kirkaldy | 260—75 |
| 3,394,165 | 7/1968 | McClellan et al. | 260—453 |
| 3,449,256 | 6/1969 | Farrissey et al. | 252—182 |

RICHARD D. LOVERING, Primary Examiner

I. GLUCK, Assistant Examiner

U.S. Cl. X.R.

260—2.5, 75, 77.5, 453